United States Patent
Endo

(10) Patent No.: US 10,604,181 B2
(45) Date of Patent: Mar. 31, 2020

(54) CONTROL UNIT OF ELECTRIC POWER STEERING APPARATUS

(71) Applicant: NSK LTD., Tokyo (JP)

(72) Inventor: Shuji Endo, Maebashi (JP)

(73) Assignee: NSK LTD., Tokyo (JP)

( * ) Notice: Subject to any disclaimer, the term of this patent is extended or adjusted under 35 U.S.C. 154(b) by 173 days.

(21) Appl. No.: 15/735,798

(22) PCT Filed: Jul. 20, 2016

(86) PCT No.: PCT/JP2016/071236
§ 371 (c)(1),
(2) Date: Dec. 12, 2017

(87) PCT Pub. No.: WO2017/014228
PCT Pub. Date: Jan. 26, 2017

(65) Prior Publication Data
US 2019/0337562 A1    Nov. 7, 2019

(30) Foreign Application Priority Data

Jul. 22, 2015  (JP) .................................. 2015-145208

(51) Int. Cl.
*B62D 6/06*      (2006.01)
*B62D 5/04*      (2006.01)
*B62D 6/02*      (2006.01)

(52) U.S. Cl.
CPC ............. *B62D 6/06* (2013.01); *B62D 5/0463* (2013.01); *B62D 5/0472* (2013.01); *B62D 6/02* (2013.01)

(58) Field of Classification Search
CPC .......... B62D 6/06; B62D 6/02; B62D 5/0463; B62D 5/0472
See application file for complete search history.

(56) References Cited

U.S. PATENT DOCUMENTS

| | | | | |
|---|---|---|---|---|
| 5,732,373 A | * | 3/1998 | Endo | B62D 5/0463 |
| | | | | 701/42 |
| 6,874,595 B2 | * | 4/2005 | Mukai | B62D 5/0463 |
| | | | | 180/446 |
| 8,924,080 B2 | * | 12/2014 | Oniwa | G05D 17/02 |
| | | | | 701/41 |

FOREIGN PATENT DOCUMENTS

| | | |
|---|---|---|
| JP | 8-137503 A | 5/1996 |
| JP | 8-290778 A | 11/1996 |
| JP | 3385763 B2 | 3/2003 |
| JP | 3493806 B2 | 2/2004 |

(Continued)

OTHER PUBLICATIONS

International Search Report for PCT/JP2016/071236 dated Oct. 11, 2016 [PCT/ISA/210].

(Continued)

*Primary Examiner* — Michael J Zanelli
(74) *Attorney, Agent, or Firm* — Sughrue Mion, PLLC

(57) ABSTRACT

A control unit of an electric power steering apparatus including a feedforward control section, that inputs input angle information and calculates a first compensation signal compensating the current command value, a feedback control section, that inputs output angle information and calculates a second compensation signal compensating the current command value, and a response control section that adjusts the current command value based on the first compensation signal and the second compensation signal.

17 Claims, 10 Drawing Sheets

(56) References Cited

FOREIGN PATENT DOCUMENTS

JP         4419840 B2     2/2010

OTHER PUBLICATIONS

International Preliminary Report on Patentability for PCT/JP2016/071236 dated Jun. 27, 2017 [PCT/JP/IPEA/409].

* cited by examiner

CONTROL UNIT OF ELECTRIC POWER STEERING APPARATUS

CROSS REFERENCE TO RELATED APPLICATIONS

This application is a National Stage of International Application No. PCT/JP2016/071236, filed on Jul. 20, 2016, which claims priority from Japanese Patent Application No. 2015-145208, filed on Jul. 22, 2015, the contents of all of which are incorporated herein by reference in their entirety.

TECHNICAL FIELD

The present invention relates to a control unit of an electric power steering apparatus that drives a motor on the basis of a current command value, and assists and controls a steering system, and in particular to a control unit of an electric power steering apparatus that improves stability without deteriorating responsiveness on steering of a steering system.

BACKGROUND ART

An electric power steering apparatus (EPS) which assists and controls a steering system of a vehicle by means of a rotational torque of a motor, applies a driving force of the motor as a steering assist torque (an assist torque) to a steering shaft or a rack shaft by means of a transmission mechanism such as gears or a belt through a reduction mechanism. In order to accurately generate the steering assist torque, such a conventional electric power steering apparatus performs feedback control of a motor current. The feedback control adjusts a voltage supplied to the motor so that a difference between a current command value and a detected motor current value becomes small, and the adjustment of the voltage supplied to the motor is generally performed by an adjustment of a duty ratio of pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque of the steering wheel 1 and a steering angle sensor 14 for detecting a steering angle θ, and a motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key (IG) signal is inputted into the control unit 30 through an ignition key 11. The control unit 30 calculates a current command value of an assist (steering assist) command on the basis of a steering torque Ts detected by the torque sensor 10 and a vehicle speed V detected by a vehicle speed sensor 12, and controls a current supplied to the motor 20 for the EPS by means of a voltage control command value Vref obtained by performing compensation or the like to the current command value.

Moreover, the steering angle sensor 14 is not essential, it does not need to be provided, and it is possible to obtain the steering angle from a rotation sensor such as a resolver connected to the motor 20.

A controller area network (CAN) 100 exchanging various information of a vehicle is connected to the control unit 30, and it is possible to receive the vehicle speed V from the CAN 100. Further, it is also possible to connect a non-CAN 101 exchanging a communication, analog/digital signals, a radio wave or the like except with the CAN 100 to the control unit 30.

The control unit 30 mainly comprises an MCU (including a CPU, an MPU and so on), and general functions performed by programs within the MCU are shown in FIG. 2.

Functions and operations of the control unit 30 will be described with reference to FIG. 2. As shown in FIG. 2, the steering torque Ts detected by the torque sensor 10 and the vehicle speed V detected by the vehicle speed sensor 12 (or from the CAN 100) are inputted into a current command value calculating section 31 that calculates a current command value Iref1. The current command value calculating section 31 calculates the current command value Iref1 that is a control target value of a motor current supplied to the motor 20 on the basis of the inputted steering torque Ts and vehicle speed V and by using an assist map or the like. The current command value Iref1 is inputted into a current limiting section 33 through an adding section 32A. A current command value Irefm the maximum current of which is limited is inputted into a subtracting section 32B, and a deviation ΔI (=Irefm−Im) between the current command value Irefm and a motor current value Im being fed back is calculated. The deviation ΔI is inputted into a proportional integral (PI) control section 35 for improving a characteristic of the steering operation. The voltage control command value Vref whose characteristic is improved by the PI-control section 35 is inputted into a PWM-control section 36. Furthermore, the motor 20 is PWM-driven through an inverter 37 serving as a driving section. The motor current value Im of the motor 20 is detected by a motor current detector 38 and is fed back to the subtracting section 32B. The inverter 37 uses field effect transistors (FETs) as driving elements and is comprised of a bridge circuit of FETs.

A compensation signal CM from a compensation signal generating section 34 is added to the adding section 32A, and a characteristic compensation of the steering system is performed by the addition of the compensation signal CM so as to improve a convergence, an inertia characteristic and so on. The compensation signal generating section 34 adds a self-aligning torque (SAT) 34-3 and an inertia 34-2 at an adding section 34-4, further adds the result of addition performed at the adding section 34-4 with a convergence 34-1 at an adding section 34-5, and then outputs the result of addition performed at the adding section 34-5 as the compensation signal CM.

In such an electric power steering apparatus (EPS), since stability and responsiveness of an operation are contrary characteristics, compatibility of both characteristics becomes a problem. In particular, in the case of considering developing the EPS to a driving support apparatus, it is desired to stabilize a vibration mode of a two-inertia system consisting of steering wheel inertia and motor inertia which are constituting the EPS, and suppress a vibration without deteriorating responsiveness.

There is, for example, a control apparatus described in the publication of Japanese Patent No. 3493806 B2 (Patent Document 1) as such an apparatus improving the stability of the vibration mode. The control apparatus described in Patent Document 1 improves stability and responsiveness of a control system by comprising a stability compensator that operates so as to counteract a peak of a resonance frequency of a resonance system consisting of an inertia element and a spring element which constitute an EPS. The stability compensator performs pole-and-zero cancellation in order to counteract the peak of the resonance frequency.

A control unit described in the publication of Japanese Patent No. 3385763 B2 (Patent Document 2) improves stability when a steering wheel is located at the center (stability at the on-center). In the vicinity of the on-center, that is, in the case that a vehicle travels straight, quick steering is not performed, and there are time that correction of a current command value is not performed sufficiently, so that the control unit detects the straight traveling state of the vehicle, and improves the stability in the vicinity of the on-center by adding a correction value to the current command value in the straight traveling state.

THE LIST OF PRIOR ART DOCUMENTS

Patent Documents

Patent Document 1: Japanese Patent No. 3493806 B2
Patent Document 2: Japanese Patent No. 3385763 B2

SUMMARY OF THE INVENTION

Problems to be Solved by the Invention

However, since the apparatus disclosed in Patent Document 1 suppresses the peak of the resonance frequency even if there is discordance at a corner frequency of an actual control target by setting a damping factor by which damping works sufficiently to a characteristic of a control target of an approximation model, there is a possibility that a little deterioration occurs in the responsiveness. Further, since the apparatus does not distinguish control in the vicinity of the on-center from one elsewhere, there is a possibility that a little instability occurs in the stability in the vicinity of the on-center.

Since the unit disclosed in Patent Document 2 mainly aims to improve the stability in the vicinity of the on-center, responsiveness in a vehicle state including a state at the on-center is not described, and is not clear.

The present invention has been developed in view of the above-described circumstances, and an object of the present invention is to provide a control unit of an electric power steering apparatus that stabilizes a vibration mode of a two-inertia system consisting of steering wheel inertia and motor inertia without deteriorating responsiveness.

Means for Solving the Problems

The present invention relates to a control unit of an electric power steering apparatus that drives a motor based on a current command value, and assists and controls a steering system, the above-described object of the present invention is achieved by that comprising: a feedforward control section that inputs input angle information and calculates a first compensation signal compensating the current command value; a feedback control section that inputs output angle information and calculates a second compensation signal compensating the current command value; and a response control section that adjusts the current command value based on the first compensation signal and the second compensation signal.

The above-described object of the present invention is more effectively achieved by that wherein the response control section inputs a difference between the first compensation signal and the second compensation signal; or wherein a first response control section that inputs the first compensation signal and a second response control section that inputs the second compensation signal are comprised as the response control section, and wherein a difference between an output of the first response control section and an output of the second response control section is used for adjustment of the current command value; or wherein the feedback control section arranges a pole of a characteristic of a vibration mode where steering wheel inertia and motor inertia that constitute the electric power steering apparatus are relatively displaced in a steering stabilization frequency domain, wherein the response control section performs pole-and-zero cancellation so as to cancel the characteristic of the vibration mode, and wherein the feedforward control section enables stability and responsiveness of the characteristic of the vibration mode at on-center to be set independently; or wherein the steering stabilization frequency domain ranges in about 20 Hz and over; or wherein the feedback control section performs pole arrangement with respect to the characteristic of the vibration mode by raising a resonance ratio of a two-inertia system consisting of the steering wheel inertia and the motor inertia; or wherein the resonance ratio is more than or equal to about 2; or wherein the feedback control section provides the pole with damping by a phase advance characteristic; or wherein a damping factor of the characteristic of the vibration mode becomes more than or equal to a predetermined value by the pole-and-zero cancellation performed by the response control section; or wherein the predetermined value is about 0.6; or wherein the feedforward control section performs phase compensation; or wherein the control unit comprises a phase compensation control section that performs phase compensation with respect to the current command value before the response control section adjusts the current command value; or wherein the input angle information is a steering wheel angle, and the output angle information is a steering angle.

Effects of the Invention

The control unit of the electric power steering apparatus of the present invention enables improvement of stability without deteriorating responsiveness by setting a characteristic obtained by combining a pole movement and pole-and-zero cancellation to a characteristic of a two-inertia system consisting of the steering wheel inertia and the motor inertia, and enhancing degree of freedom in setting a characteristic in the vicinity of the on-center.

MODE FOR CARRYING OUT THE INVENTION

The present invention aims to improve stability without deteriorating responsiveness on steering of a steering system.

Figure 3:
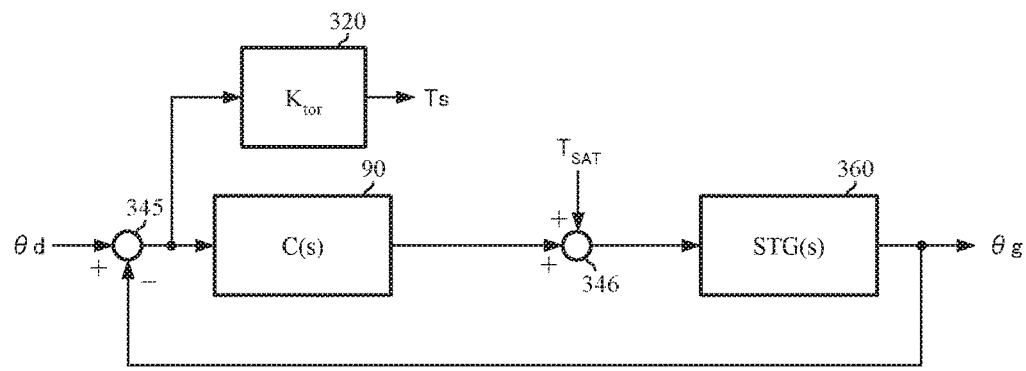
FIG. 3 is a block diagram showing a configuration of a conventional steering system including a torsion bar.

FIG. 3 is a block diagram showing a configuration of a conventional steering system including a torsion bar as a part of a control section. In FIG. 3, C(s) is a characteristic of a control system including the torsion bar, STG(s) is a steering characteristic, $K_{tor}$ is a torsion bar rigidity, $\theta d$ is a steering wheel angle, $\theta g$ is a steering angle, $T_{SAT}$ is a self-aligning torque (SAT), and the steering system comprises a gain section 320 whose gain is the $K_{tor}$, a characteristic section 90 having the C(s), a characteristic section 360 having the STG(s), a subtracting section 345 and an adding section 346. The steering wheel angle $\theta d$ is used as angle information of steering wheel inertia system (input angle information), the steering angle $\theta g$ is used as angle information of motor inertia system (output angle information), and data other than these, for example, a motor angle may be used as the output angle information.

From FIG. 3, it is found out that a conventional power assist control (a steering torque control) is a control to make the steering angle $\theta g$ track the steering wheel angle $\theta d$. An error occurring in the tracking is a steering torque Ts, and it is one of control purposes to adjust this tracking error and provide a driver with steering torque information. However, since it is desired that two functions consisting of stabilization of a system and adjustment of the tracking error are compatible, feasible functions are limited.

Figure 4:
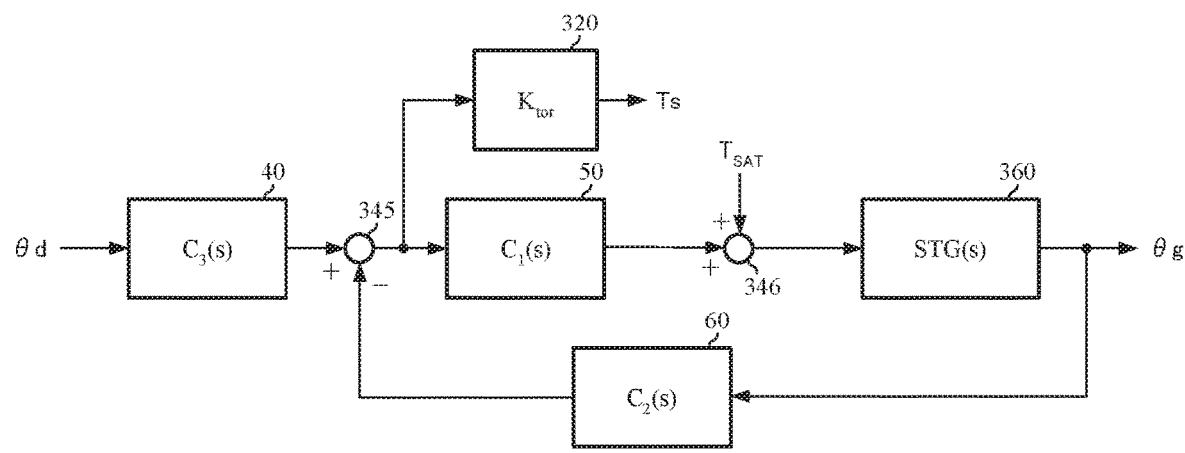
FIG. 4 is a block diagram showing a configuration of a steering system according to the present invention.

Accordingly, utilizing the steering angle (the output angle information) and using a control section that inputs the steering angle (the output angle information) and the steering wheel angle (the input angle information), makes the above two functions compatible. A block diagram, corresponding to FIG. 3, where such a control section is used is shown in FIG. 4. In FIG. 4, $C_1(s)$, $C_2(s)$ and $C_3(s)$ are transfer characteristics, and a steering system comprises the gain section 320 whose gain is the $K_{tor}$, a response control section 50 having the $C_1(s)$, a feedback control section 60 having the $C_2(s)$, a feedforward control section 40 having the $C_3(s)$, the characteristic section 360 having the STG(s), the subtracting section 345 and the adding section 346.

As shown in FIG. 4, by inserting the feedforward control section 40 and the feedback control section 60, the function of the response control section 50 inputting the tracking error can be narrowed to a function to adjust the tracking error and provide the driver with the steering torque information, and it is possible to enhance degree of freedom in setting.

A current command value compensated on the basis of a compensation signal calculated by the feedforward control section 40 using the steering wheel angle $\theta d$ and a compensation signal calculated by the feedback control section 60 using the steering angle $\theta g$ fed back, is inputted into the response control section 50. Therefore, in the case of designing these three control sections, since a change of a power assist gain (a gain used for a steering torque at a current command value calculating section) has a significant influence on stability, the design is performed by dividing controls into a control in a region where power assist (assist control) is performed (hereinafter referred to a "power assist control") and a control in the vicinity of the on-center where the power assist is not performed (hereinafter referred to an "on-center control"). The response control section 50 and the feedback control section 60 are designed to perform the power assist control, and the feedforward control section 40 is designed to perform the on-center control.

First, the power assist control will be described.

Figure 5:
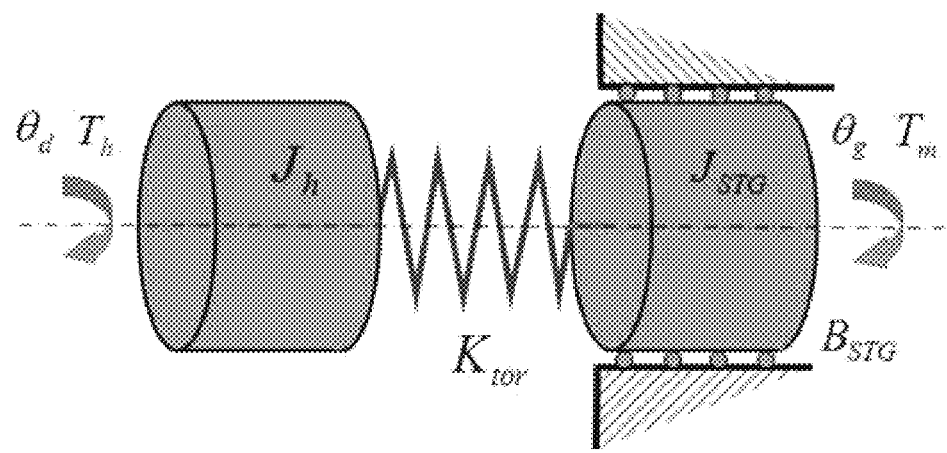
FIG. 5 is an image diagram showing a structure of a two-inertia system.
Figure 6:
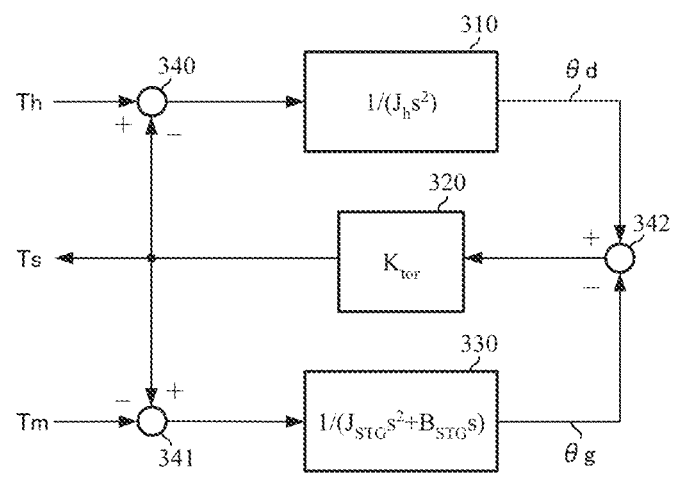
FIG. 6 is a block diagram of modeling the structure of the two-inertia system.

An EPS has a structure of a two-inertia system of connecting the steering wheel inertia and the motor inertia by a spring element of a torsion bar, and the structure is modeled as shown in FIG. 5. In FIG. 5, Th is a steering wheel torque, Tm is a motor torque, $J_h$ is a vibration parameter of the steering wheel inertia, and $J_{STG}$ and $B_{STG}$ are vibration parameters of the motor inertia. In this model, since a SAT largely changes in accordance with an operation condition, it is regarded as a disturbance. This model is expressed as a block diagram shown in FIG. 6. In FIG. 6, s is a Laplace operator, and the model comprises a characteristic section 310 having a characteristic of $1/(J_h \cdot s^2)$, a characteristic section 330 having a characteristic of $1/(J_{STG} \cdot s^2 + B_{STG} \cdot s)$, a gain section 320 whose gain is the $K_{tor}$, and a subtracting section 340, 341 and 342.

From FIG. 6, a control target is a transfer characteristic P (s) that inputs a motor torque and outputs a steering torque, and the transfer characteristic P (s) is expressed by the following expression 1.

$$P(s) = \frac{T_s(s)}{T_m(s)} = \frac{K_{tor} J_h s}{J_h J_{STG} s^3 + J_h B_{STG} s^2 + K_{tor}(J_{STG} + J_h)s + K_{tor} B_{STG}} \quad \text{[Expression 1]}$$

Since the above expression 1 includes a vibration mode where two kinds of inertia (the steering wheel inertia and the motor inertia) are changed integrally (hereinafter referred to an "integrated mode") and a vibration mode where the two kinds of inertia are relatively displaced (hereinafter referred to a "relative mode"), the transfer characteristic P(s) is divided into the integrated mode and the relative mode.

Since a transfer characteristic $P_n(s)$ of the integrated mode corresponds to a mode where infinity is set on the torsion bar rigidity $K_{tor}$, it becomes the following expression 2.

$$P_n(s) = \lim_{K_{tor} \to \infty} P(s) = \frac{J_h s}{(J_h + J_{STG})s + B_{STG}} \quad \text{[Expression 2]}$$

In the case that Δ(s) is a characteristic difference (a multiplicative representation) between the P(s) and the $P_n(s)$, the P(s) is expressed by the following expression 3, and a transfer characteristic of the relative mode becomes the following expression 4.

$$P(s) = P_n(s)(1 + \Delta(s)) \quad \text{[Expression 3]}$$

$$1 + \Delta(s) = \frac{K_{tor}(J_{STG} + J_h)s + B_{STG}K_{tor}}{J_h J_{STG} s^3 + J_h B_{STG} s^2 + K_{tor}(J_{STG} + J_h)s + K_{tor} B_{STG}} \quad \text{[Expression 4]}$$

In the above expression 4, $K_{tor}B_{STG}$ is sufficiently smaller than other terms in a frequency band where the characteristic should be made stabilized, and can be ignored, so that the expression 4 can be approximated by the following expression 5.

$$1 + \Delta(s) = \frac{K_{tor}(J_{STG} + J_h)}{J_h J_{STG} s^2 + J_h B_{STG} s + K_{tor}(J_{STG} + J_h)} \quad \text{[Expression 5]}$$

Since a natural frequency of the transfer characteristic 1+Δ(s) of the relative mode generally exists in a control band of a control unit, a pole movement is necessary for stabilization. Further, the present invention performs the stabilization by using an internal model, and it is necessary to suppress an influence on disturbance sensitivity of the control unit which uses the internal model as much as possible in the control band.

Figure 7:
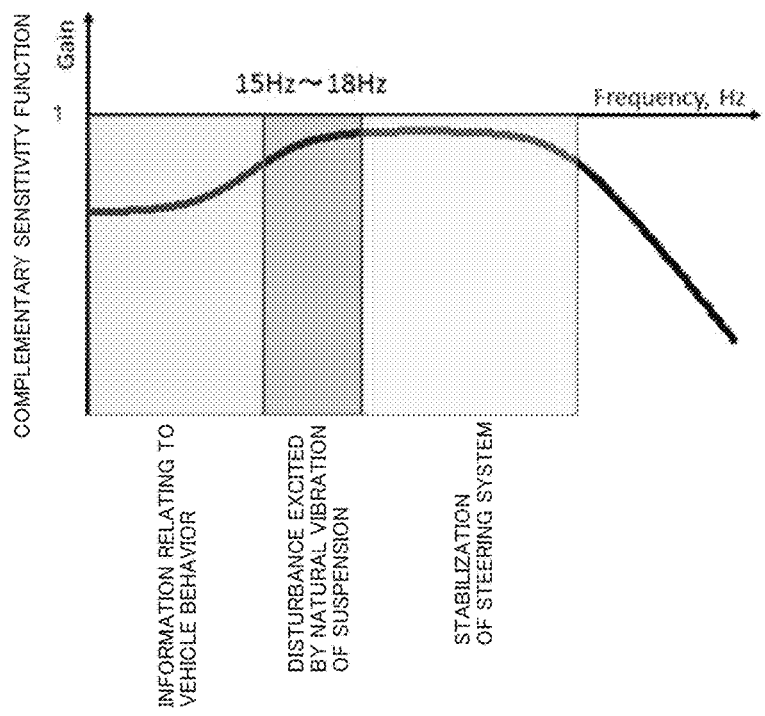
FIG. 7 is a characteristic diagram showing a characteristic of a desirable disturbance sensitivity function.

With respect to the disturbance sensitivity, a desirable function of the disturbance sensitivity is as shown in FIG. 7. In FIG. 7, a complementary sensitivity function being a function showing the disturbance sensitivity is expressed, the vertical axis shows a gain, and the horizontal axis shows a frequency. The complementary sensitivity function is a function showing that a disturbance is suppressed when again is 1 and that the disturbance is transmitted when the gain is smaller than 1. As shown in FIG. 7, since information relating to vehicle behavior exists in a frequency domain where a frequency is smaller than a natural frequency of a suspension, sensitivity to the disturbance should be high to actively transmit the disturbance. However, the disturbance should be suppressed for stabilization in a frequency domain where a frequency is larger than the natural frequency of the suspension. In order to obtain such a disturbance sensitivity characteristic, it is desirable to make a characteristic of the Δ(s) disappear, that is, to cancel the characteristic of the Δ(s) by pole-and-zero cancellation which uses the internal model. However, since the pole-and-zero cancellation has a problem with respect to robust stability in the case of changing a characteristic of a control target, it is necessary to sufficiently raise a damping factor of a cancelled pole and perform the pole-and-zero cancellation in order to reduce an influence on stability of the cancelled pole as much as possible. Accordingly, a pole arrangement by state feedback is performed so that a pole of the transfer characteristic 1+Δ(s) of the relative mode has sufficient damping in a stabilization domain of a steering system (a steering stabilization frequency domain) shown in FIG. 7, and enables stabilization. That is, the following actions are performed: "making a characteristic (a pole arrangement) being easy to stabilize of the characteristic of 1+Δ(s)" (hereinafter referred to a "first action"), and "performing the pole-and-zero cancellation with respect to the characteristic obtained by performing the pole arrangement so as to stabilize the characteristic" (hereinafter referred to a "second action"). Furthermore, it is more effective "to perform further stabilization with respect to the characteristic obtained by performing the pole-and-zero cancellation in order to improve the robust stability" (hereinafter referred to a "third action"). Moreover, a frequency in the steering stabilization frequency domain is more than or equal to about 20 Hz.

In the present invention, the feedback control section 60 performs the first action, and the response control section 50 performs the second action. The third action is performed by a phase compensation control section. The feedback control section 60 arranges a pole of a characteristic of the relative mode in the steering stabilization frequency domain, and the response control section 50 performs the pole-and-zero cancellation so as to cancel the characteristic of the relative mode. The phase compensation control section performs phase compensation for further stabilization.

Next, the on-center control will be described.

In the case of steering very slowly in the vicinity of the on-center, stick-slip can occur in an EPS. The stick-slip is a discontinuous motion occurring in driving at a slow speed in the case that a difference between static friction and dynamic friction is large and rigidity on a driving side is low. Though the difference between the static friction and the dynamic friction is basically controlled in the EPS so as not to cause a problem, a cogging torque of a motor can cause the stick-slip. Even if the stick-slip phenomenon has a very small value as a torque ripple, it becomes a factor impairing steering performance because of changing stepwise. The present invention prevents the stick-slip by enhancing dynamic rigidity of the two-inertia system.

As described above, since the stick-slip occurs in the case of steering very slowly in the vicinity of the on-center, the power assist is not almost performed, and the power assist control does not function. Therefore, a control section performing the on-center control is necessary to arrange parallel to a characteristic of the power assist. In this control section arranged in parallel, a stationary gain needs to be 0 so that a stationary gain of the whole control unit agrees with the power assist gain. That is, the control section needs to be a control section having a differential characteristic. The present invention comprises the feedforward control section 40 as this control section. The feedforward control section 40 is designed so as to satisfy the above condition, and is designed as a phase compensator so as to set the stability and the responsiveness independently.

Thus, the present invention can improve the stability without deteriorating the responsiveness by stabilizing the characteristic of the relative mode by the pole movement and the pole-and-zero cancellation in the region where the power assist is performed, and by making the stability and the responsiveness possible to set independently by the phase compensation and suppressing the stick-slip in the vicinity of the on-center where the power assist is not performed.

Figure 8:
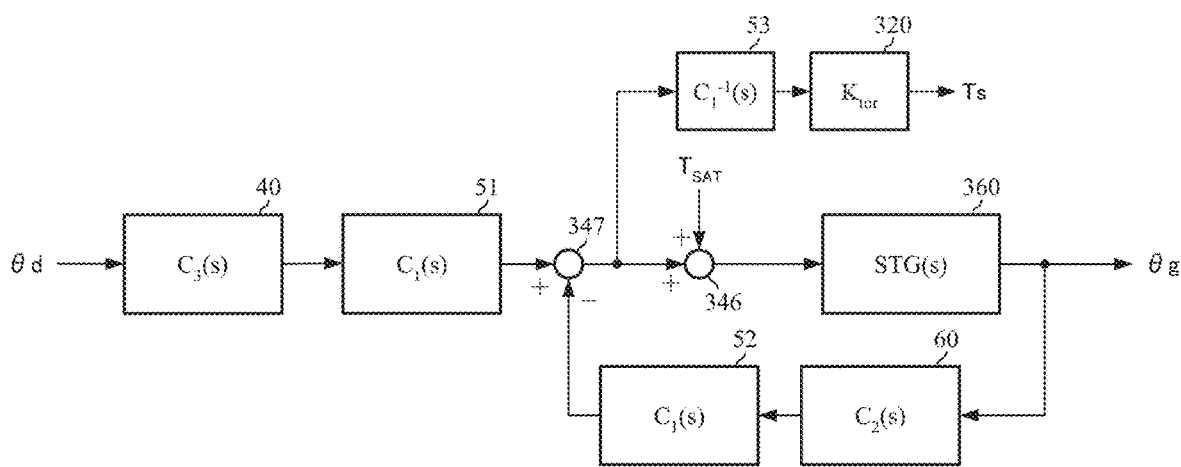
FIG. 8 is a block diagram showing a modified example of the configuration of the steering system according to the present invention.

Moreover, it is possible to transform the configuration of the steering system shown in FIG. 4 to the configuration as shown in FIG. 8, and it is possible to configure the present invention based on the configuration of the steering system shown in FIG. 8. The steering system shown in FIG. 8 comprises two response control sections, the compensation signal from the feedforward control section 40 is inputted into a response control section 51, the compensation signal from the feedback control section 60 is inputted into a response control section 52, and an output data from the response control section 51 and an output data from the response control section 52 are inputted into a subtracting section 347.

Hereinafter, an embodiment of the present invention will be described with reference to the accompanying drawings.

Figure 1:
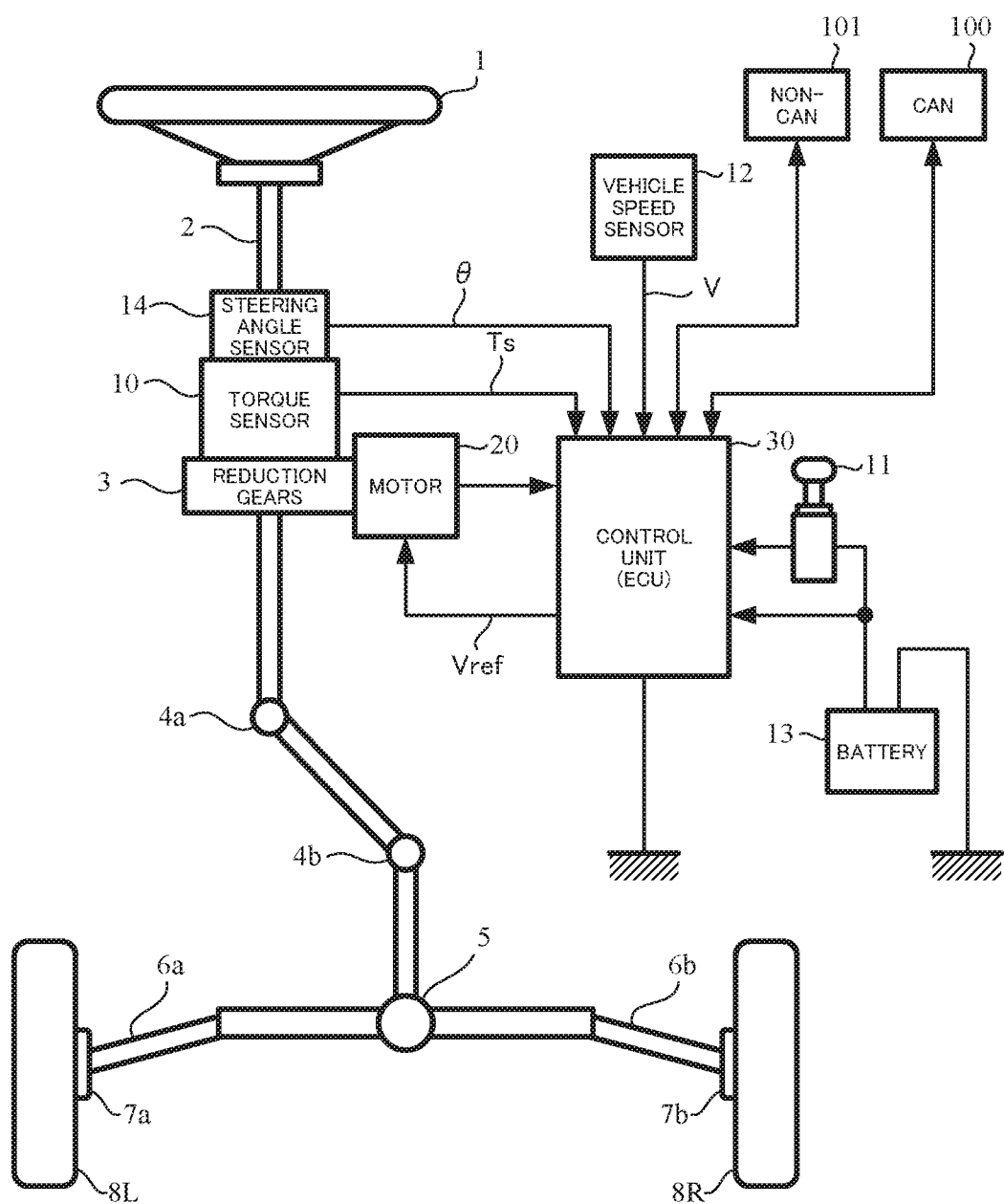
FIG. 1 is a configuration diagram illustrating a general outline of an electric power steering apparatus.
Figure 2:
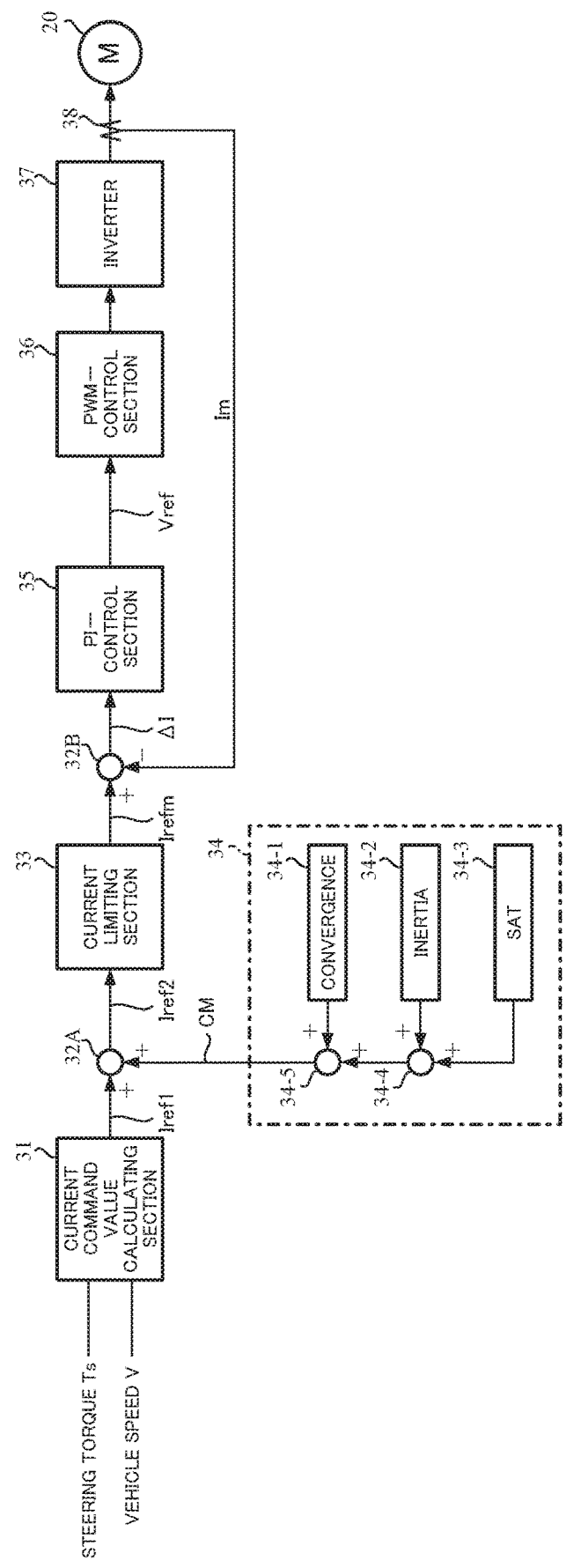
FIG. 2 is a block diagram showing a configuration example of a control unit (ECU) of the electric power steering apparatus.
Figure 9:
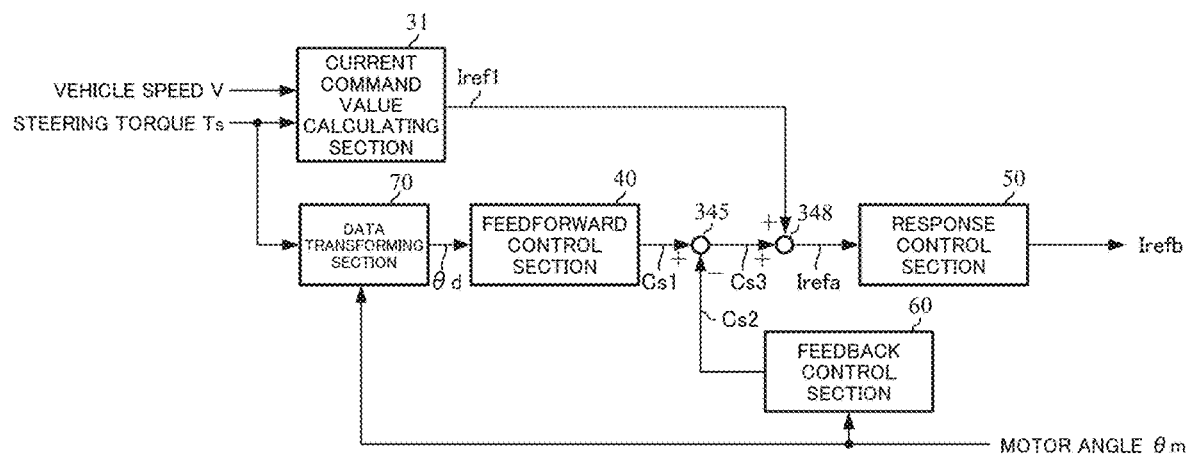
FIG. 9 is a block diagram showing a configuration example (a first embodiment) of the present invention.

FIG. 9 shows a configuration example (a first embodiment) of the embodiment of the present invention. Since a current command value calculating section 31 has the same configuration as the current command value calculating section 31 shown in FIG. 2, the explanation is omitted.

A data transforming section 70 calculates the steering wheel angle θd by means of a motor angle θm and the steering torque Ts. The feedforward control section 40 performs the on-center control by the phase compensation using the steering wheel angle θd, and outputs a compensation signal Cs1. The feedback control section 60 performs the first action of arranging the pole of the characteristic of the relative mode in the steering stabilization frequency domain by using the motor angle θm, and outputs a compensation signal Cs2. Though the feedback control section 60 inputs the steering angle θg in FIG. 4, the present configuration example inputs the motor angle θm into the feedback control section 60 because the steering angle θg is proportional to the motor angle θm and the first action can be performed also using the motor angle θm. The response control section 50 inputs a current command value Irefa generated by compensating a current command value Iref1 outputted from the current command value calculating section 31 by means of the compensation signal Cs1 and the compensation signal Cs2, transforms the current command value Irefa in accordance with a characteristic designed so as to cancel the characteristic of the relative mode by the pole-and-zero cancellation, and outputs the transformed current command value as a current command value Irefb. The current command value Irefb is inputted into a current limiting section 33 shown in FIG. 2, after that, the same operations as described above are performed through a subtracting section 32B, a PI-control section 35, a PWM-control section 36 and an inverter 37, and a motor 20 is PWM-driven.

Each section will be described in detail.

First, the feedback control section 60 will be described.

The feedback control section 60 makes a characteristic (a pole arrangement) being easy to stabilize of the characteristic (1+Δ(s)) of the relative mode by raising a resonance ratio of the two-inertia system.

The resonance ratio of the two-inertia system is a ratio of a resonance frequency to an anti-resonance frequency, and in the case of ignoring the damping factor of the two-inertia system, an anti-resonance frequency ωa, a resonance frequency ωr and a resonance ratio H are expressed by the following expression 6, expression 7 and expression 8 respectively.

$$\omega_a = \sqrt{\frac{K_{tor}}{J_h}}$$ [Expression 6]

$$\omega_r = \sqrt{\frac{K_{tor}}{J_h}\left(1 + \frac{J_h}{J_{STG}}\right)}$$ [Expression 7]

$$H = \frac{\omega_r}{\omega_a} = \sqrt{1 + \frac{J_h}{J_{STG}}}$$ [Expression 8]

A damping factor ξ of the transfer characteristic of the relative mode expressed by the expression 5 can be expressed by a function of the resonance ratio H expressed as the following expression 10 in accordance with the following expression 9 obtained by transforming the expression 5 and the expression 8.

$$1 + \Delta(s) = \frac{K_{tor}\left(\frac{1}{J_{STG}} + \frac{1}{J_h}\right)}{s^2 + \frac{B_{STG}}{J_{STG}}s + K_{tor}\left(\frac{1}{J_{STG}} + \frac{1}{J_h}\right)}$$ [Expression 9]

$$\xi = \frac{1}{2}\left(H - \frac{1}{H}\right)\sqrt{\frac{1}{J_h K_{tor}}} B_{STG}$$ [Expression 10]

Figure 10:
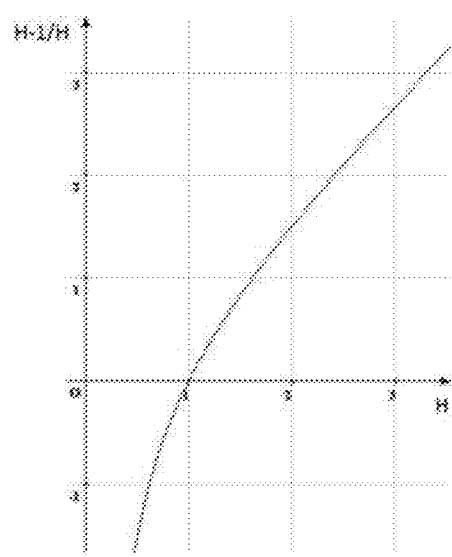
FIG. 10 is a graph showing a function of a resonance ratio for changing a damping factor.

Since H−1/H in the expression 10 is a monotone increasing function of the H as shown in FIG. 10, it is found out that the pole of the characteristic of the relative mode is provided with the damping factor by increasing the resonance ratio H and the characteristic can be stabilized. With respect of variables of the expression 8 and the expression 10, since the $J_h$ and the $K_{tor}$ are often determined depending on requirements of a basic steering characteristic, the $J_{STG}$ and the $B_{STG}$ are adjusted in order to raise the resonance ratio and the damping factor. The adjustment of the $J_h$ is performed by the feedback control section 60 as a design subject of the pole arrangement, and the adjustment of the $B_{STG}$ is performed by the response control section 50 as a design subject of the pole-and-zero cancellation.

Figure 11:
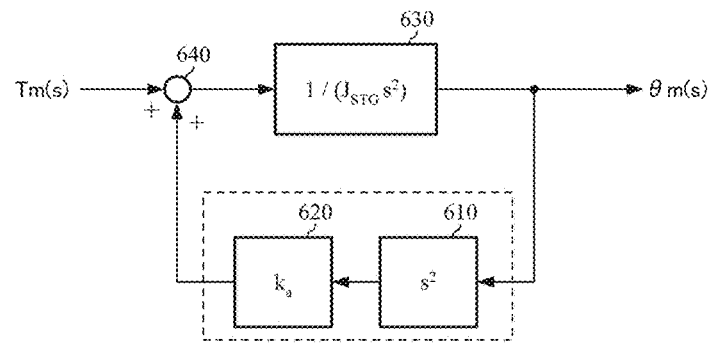
FIG. 11 is a block diagram showing a conception of control by feedback of a motor angle.

The adjustment of the $J_h$ is performed by means of the state feedback as shown in FIG. 9. The motor angle θm is fed back. A conception of control by feedback of the motor angle θm is expressed by a block diagram as shown in FIG. 11. In FIG. 11, ka is a feedback gain, and the configuration comprises a second order differential section 610 performing $s^2$, that is, second order differential, a gain section 620 whose gain is the ka, a characteristic section 630 having a characteristic of $1/(J_{STG}\cdot s^2)$, and an adding section 640. A transfer characteristic of the present configuration is expressed by the following expression 11.

$$\frac{\theta_m(s)}{T_m(s)} = \frac{1}{(J_{STG} - k_a)s^2}$$ [Expression 11]

Therefore, by multiplying a motor angular acceleration αm obtained by second-order-differentiating the motor angle θm by the feedback gain ka and feeding back the multiplication result to the motor torque Tm additionally, a transfer characteristic after the addition can be compensated as a characteristic obtained by subtracting the feedback gain ka from the motor inertia. That is, it is possible to adjust the $J_{STG}$ by adjusting the feedback gain ka.

The feedback control section 60 comprises the second order differential section 610 and the gain section 620 that are enclosed with the broken line in FIG. 11. The second order differential section 610 calculates the motor angular acceleration αm by second-order-differentiating the motor angle θm. The feedback gain ka by which the motor angular acceleration am is multiplied at the gain section 620, is adjusted so that the resonance ratio H becomes a desired value. An appropriate resonance ratio for stability is about 2.

Moreover, the feedback control section 60 performs the pole arrangement by using the state feedback, however, since various controllers effective in the pole arrangement of the two-inertia system have been proposed, it is possible to use them. Further, it is possible to feed back data other than the motor angle θm.

Next, the response control section 50 will be described.

The response control section 50 performs the pole-and-zero cancellation with respect to the characteristic (the pole) obtained by performing the pole arrangement. Since the characteristic which should be cancelled is the transfer characteristic 1+Δ(s) of the relative mode expressed by the expression 5, the response control section 50 has, for example, the characteristic $C_1(s)$ expressed by the following expression 12 in order to perform the pole-and-zero cancellation.

$$C_1(s) = \frac{s^2 + \frac{B_{STG}}{J_{STG}}s + \frac{K_{tor}(J_{STG} + J_h)}{J_h J_{STG}}}{s^2 + a_1 s + \frac{K_{tor}(J_{STG} + J_h)}{J_h J_{STG}}} \quad \text{[Expression 12]}$$

$a_1$ is a parameter for adjustment, and the $a_1$ and the $B_{STG}$ are adjusted so that the damping factor of the characteristic of the relative mode becomes a desired value. An appropriate damping factor for stabilization is more than or equal to about 0.6.

Finally, the feedforward control section 40 will be described.

The feedforward control section 40 needs to have a characteristic where the stationary gain is 0 and which becomes a differential characteristic, as described above, in order to prevent the stick-slip.

Figure 12:
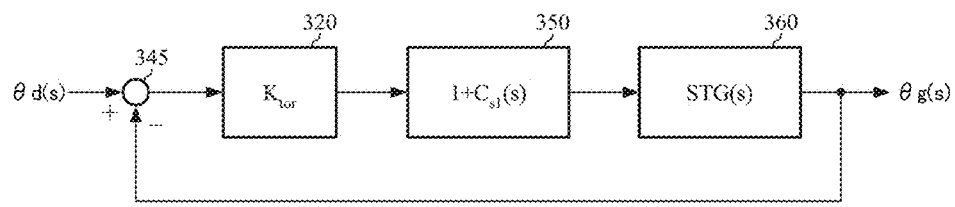
FIG. 12 is a block diagram of modeling a structure of a two-inertia system in the vicinity of the on-center.

Since a steering torque is small in the vicinity of the on-center and a torque fed back to a steering wheel side can be ignored, the block diagram expressing the model shown in FIG. 5 can be simplified as shown in FIG. 12. In FIG. 12, $C_{s1}(s)$ is a differential characteristic, STG(s) is a steering characteristic, and the configuration comprises the gain section 320 whose gain is the $K_{tor}$, a characteristic section 350 having a characteristic of 1+$C_{s1}(s)$, the characteristic section 360 having the STG(s), and the subtracting section 345.

A closed-loop characteristic in FIG. 12 is expressed by the following expression 13.

$$\frac{\theta_g(s)}{\theta_d(s)} = \frac{K_{tor}(1 + C_{s1}(s))STG(s)}{1 + K_{tor}(1 + C_{s1}(s))STG(s)} \quad \text{[Expression 13]}$$

In the case of $C_{s1}(s)=K_d \cdot s$ ($K_d$ is an adjustment gain), since the STG(s) is expressed by the following expression 14, the above expression 13 is transformed into the following expression 15, so that the damping is improved, however, the responsiveness is also changed.

$$STG(s) = \frac{1}{J_{STG}s^2 + B_{STG}s} \quad \text{[Expression 14]}$$

$$\frac{\theta_g(s)}{\theta_d(s)} = \frac{K_{tor}(1 + K_d s)}{J_{STG}s^2 + (B_{STG} + K_d K_{tor})s + K_{tor}} \quad \text{[Expression 15]}$$

Figure 13:
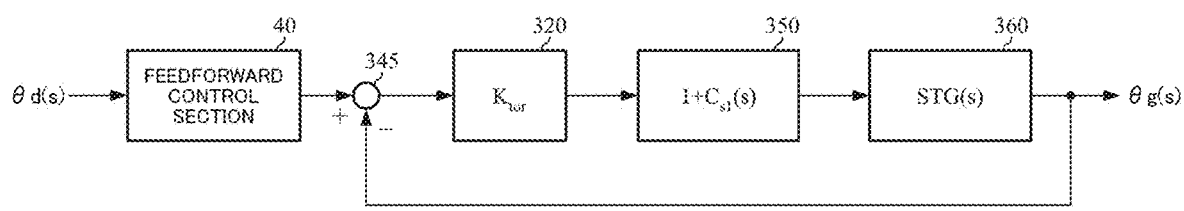
FIG. 13 is a block diagram showing a configuration of adding phase compensation to the structural model of the two-inertia system in the vicinity of the on-center.

Therefore, since there is no degree of freedom of designing the stability and the responsiveness independently if the above expression 15 is as it is, providing the feedforward control section 40 enables the stability and the responsiveness to be set independently as shown in FIG. 13. In the case that a characteristic of the feedforward control section 40 is, for example, a phase compensation characteristic $C_3(s)$ expressed by the following expression 16, a characteristic of the configuration shown in FIG. 13 is expressed by the following expression 17. In the following expression 17, a phase advance term is shown, and this is a necessary function to compensate deterioration of the responsiveness caused by deterioration of mechanical rigidity of hands and arms needed to reduce a physical load. However, since further conditions and examinations are necessary for an analysis showing this effect, the following expression 17 is only given.

$$C_3(s) = \frac{1 + K_{dd}s}{1 + K_d s} \quad \text{[Expression 16]}$$

$$\frac{\theta_g(s)}{\theta_d(s)} = \frac{K_{tor}(1 + K_d s)}{J_{STG}s^2 + (B_{STG} + K_d K_{tor})s + K_{tor}} \cdot \frac{(1 + K_{dd}s)}{(1 + K_d s)} = \quad \text{[Expression 17]}$$

$$\frac{K_{tor}(1 + K_{dd}s)}{J_{STG}s^2 + (B_{STG} + K_d K_{tor})s + K_{tor}}$$

$K_{dd}$ is an adjustment gain. Since the feedforward control section 40 affects the responsiveness, introducing the $K_{dd}$ enables the stability and the responsiveness to be set independently.

Since the steering wheel angle θd is inputted into the feedforward control section 40, the data transforming section 70 is provided at the front stage of the feedforward control section 40, the data transforming section 70 calculates the steering wheel angle θd by using the steering torque Ts and the motor angle θm in accordance with the following expression 18 derived from the relation that the θg(s) is proportional to the θm and the configuration shown in FIG. 6, and the steering wheel angle θd is inputted into the feedforward control section 40.

$$\theta_d(s) = \frac{T_s}{K_{tor}} + \frac{\theta_m}{g} \quad \text{[Expression 18]}$$

g is a proportionality constant. The data transforming section 70 may not input the motor angle θm, but may input the steering angle θg (=θm/g), and the feedforward control section 40 may directly input the steering wheel angle θd detected by a sensor or the like not through the data transforming section 70.

Moreover, it is possible to set the stability and the responsiveness independently by using a characteristic other than the phase compensation characteristic as the characteristic of the feedforward control section 40.

Figure 14:
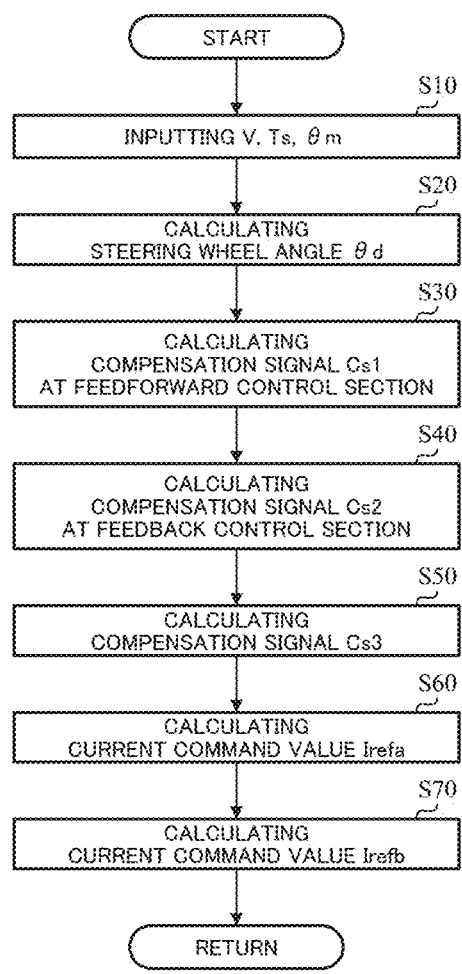
FIG. 14 is a flowchart showing an operating example (the first embodiment) of the present invention.

In the above configuration, an operating example of the first embodiment will be described with reference to a flowchart shown in FIG. 14.

When the operation is started, a vehicle speed V, the steering torque Ts and the motor angle θm are inputted (Step S10), the vehicle speed V is inputted into the current command value calculating section 31, the steering torque Ts is inputted into the current command value calculating section 31 and the data transforming section 70, and the motor angle θm is inputted into the data transforming section 70 and the feedback control section 60.

The data transforming section 70 calculates the steering wheel angle θd by using the inputted steering torque Ts and motor angle θm in accordance with the expression 18, and outputs the steering wheel angle θd to the feedforward control section 40 (Step S20).

The feedforward control section 40 calculates the compensation signal Cs1 by transforming the steering wheel angle θd using the phase compensation characteristic $C_3(s)$ expressed by the expression 16, and outputs the compensation signal Cs1 to the subtracting section 345 (Step S30). Moreover, preadjusted values are set on the Kd and the Kdd in the expression 16 so as to obtain desired damping and responsiveness.

In the feedback control section 60, the motor angle θm is inputted into the second order differential section 610, where the motor angular acceleration am is calculated, and the motor angular acceleration am is inputted into the gain section 620. The gain section 620 multiplies the motor angular acceleration am by the feedback gain ka, and outputs the multiplication result as the compensation signal Cs2 to the subtracting section 345 (Step S40). Moreover, a preadjusted value is set on the feedback gain ka so that the resonance ratio H becomes a desired value.

The compensation signal Cs2 is subtracted from the compensation signal Cs1 at the subtracting section 345, and the subtraction result is inputted as a compensation signal Cs3 into an adding section 348 (Step S50).

The current command value Iref1 that the current command value calculating section 31 has calculated by the vehicle speed V and the steering torque Ts, is added to the compensation signal Cs3 at the adding section 348, and the addition result is inputted as the current command value Irefa into the response control section 50 (Step S60).

The response control section 50 transforms the current command value Irefa in accordance with the expression 12, and outputs the transformation result as the current command value Irefb (Step S70). Moreover, preadjusted values are set on the $a_1$ and the $B_{STG}$ in the expression 12 so that the damping factor of the characteristic of the relative mode becomes a desired value.

Next, a second embodiment of the present invention will be described.

Figure 15:
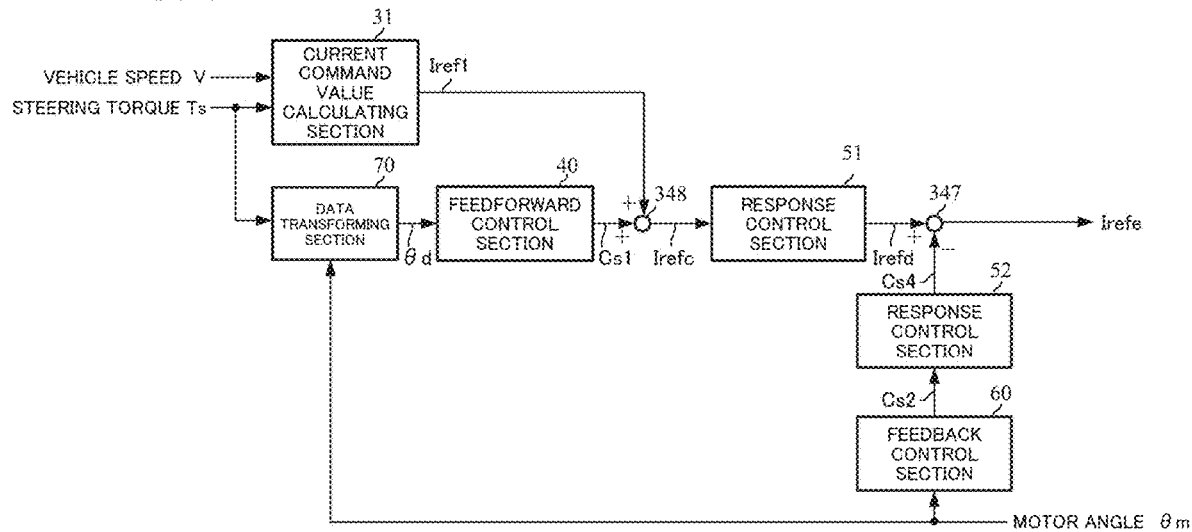
FIG. 15 is a block diagram showing a configuration example (a second embodiment) of the present invention.

The first embodiment is configured on the basis of the configuration of the steering system shown in FIG. 4. As described above, the configuration of the steering system shown in FIG. 4 can be transformed to the configuration as shown in FIG. 8, and a configuration example (the second embodiment) shown in FIG. 15 is configured on the basis of the configuration of the steering system shown in FIG. 8. In the present configuration example, two response control sections (the response control sections 51 and 52) are provided, and the compensation signal from the feedback control section 60 is used not at the front stage but at the rear stage. Moreover, in FIG. 15, the same configurations as the first embodiment shown in FIG. 9 are designated with the same numerals, and the explanation is omitted.

The response control section 51 inputs a current command value Irefc generated by compensating the current command value Iref1 by the compensation signal Cs1 outputted from the feedforward control section 40, and outputs a current command value Irefd calculated by the pole-and-zero cancellation. The response control section 52 inputs the compensation signal Cs2 outputted from the feedback control section 60, and outputs a compensation signal Cs4. The current command value Irefd is compensated at the subtracting section 347 by the compensation signal Cs4, and the compensation result is outputted as a current command value Irefe. The current command value Irefe is inputted into the current limiting section 33 shown in FIG. 2, and after that, the same operations as the first embodiment are performed.

Figure 16:
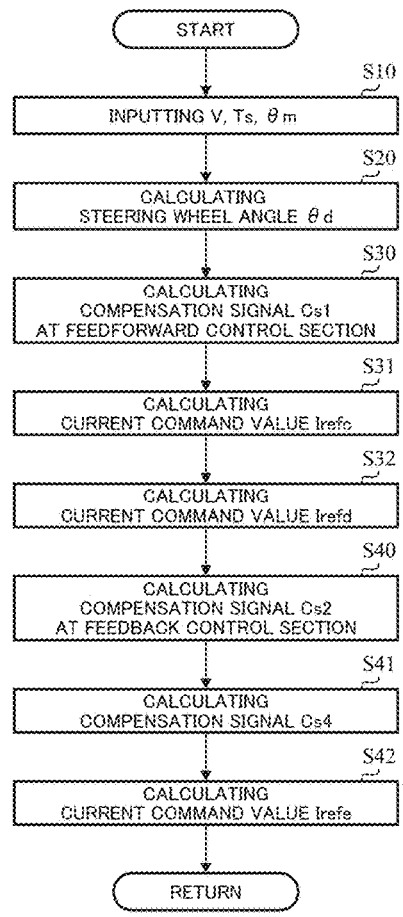
FIG. 16 is a flowchart showing an operating example (the second embodiment) of the present invention.

An operating example of the second embodiment will be described with reference to a flowchart shown in FIG. 16.

When the operation is started, the same operations as the steps S10 to S30 in the operating example of the first embodiment are performed.

The compensation signal Cs1 outputted from the feedforward control section 40 and the current command value Iref1 are added at the adding section 348, and the addition result is inputted as the current command value Irefc into the response control section 51 (Step S31).

The response control section 51 transforms the current command value Irefc in accordance with the expression 12, and outputs the transformation result as the current command value Irefd to the subtracting section 347 (Step S32).

In the feedback control section 60, the same operation as the step S40 in the operating example of the first embodiment is performed, and the compensation signal Cs2 is outputted to the response control section 52 (Step S40).

The response control section 52 transforms the compensation signal Cs2 in accordance with the expression 12, and outputs the transformation result as the compensation signal Cs4 to the subtracting section 347 (Step S41).

The compensation signal Cs4 is subtracted from the current command value Irefd at the subtracting section 347, and the subtraction result is outputted as the current command value Irefe (Step S42).

Next, a third embodiment of the present invention will be described.

The feedback control section 60 in the first embodiment feeds back the motor angular acceleration multiplied by the feedback gain adjusted so as to raise the resonance ratio of the two-inertia system in order to make the characteristic (the pole arrangement) being easy to stabilize of the characteristic of the relative mode. However, a characteristic of a current control section can affect the effect obtained by this feedback. Here, the current control section indicates an area from the input of the current command value Irefb to the output of a motor current driving the motor 20.

Though it is possible to enhance the damping factor of the characteristic of the relative mode by the feedback of the motor angular acceleration, at the same time, a feedback causing reduction of the damping factor operates by delay in the current control section, and the effect of the feedback of the motor angular acceleration can be reduced. For the influence of the delay in the current control section, the present embodiment provides damping by adding a phase advance characteristic, and enhances the damping factor.

Figure 17:
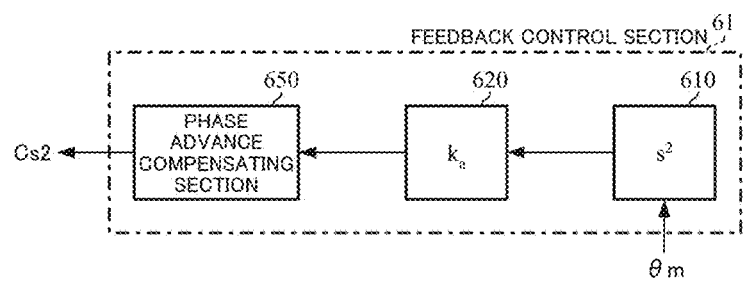
FIG. 17 is a block diagram showing a configuration example of a feedback control section in a configuration example (a third embodiment) of the present invention.

FIG. 17 is a block diagram showing a configuration example of a feedback control section in the third embodiment. Compared with the first embodiment, a phase advance compensating section 650 is added after the gain section 620.

A characteristic (a phase advance characteristic) $C_{LEAD}(s)$ that the phase advance compensating section 650 has, is expressed by the following expression 19.

$$C_{LEAD}(s) = \frac{\omega_L}{\omega_H} \cdot \frac{s + \omega_H}{s + \omega_L} \qquad \text{[Expression 19]}$$

$\omega_L$, and $\omega_H$ are phase advance compensation parameters.

It is possible to efficiently provide the damping for a pole after the arrangement by matching a frequency where an amount of phase advance obtained by the characteristic $C_{LEAD}(s)$ becomes the maximum with a frequency of the arranged pole. Since the frequency $\omega_{MAX}$ where the amount of the phase advance becomes the maximum is calculated in accordance with the following expression 20, the $\omega_L$ and the $\omega_H$ of the characteristic $C_{LEAD}(s)$ are designed so that the $\omega_{MAX}$ agrees with the frequency of the pole arranged by the feedback of the motor angular acceleration.

$$\omega_{MAX} = \sqrt{\omega_L \omega_H} \qquad \text{[Expression 20]}$$

In the feedback control section 61 of the third embodiment, the motor angular acceleration am that is multiplied by the feedback gain ka by the same operations as the second order differential section 610 and the gain section 620 in the feedback control section 60 of the first embodiment, is inputted into the phase advance compensating section 650, the phase advance compensating section 650 performs phase advance compensation by the characteristic $C_{LEAD}(s)$ expressed by the expression 19, and outputs the result of the phase advance compensation as the compensation signal Cs2.

Next, a fourth embodiment of the present invention will be described.

Figure 18:
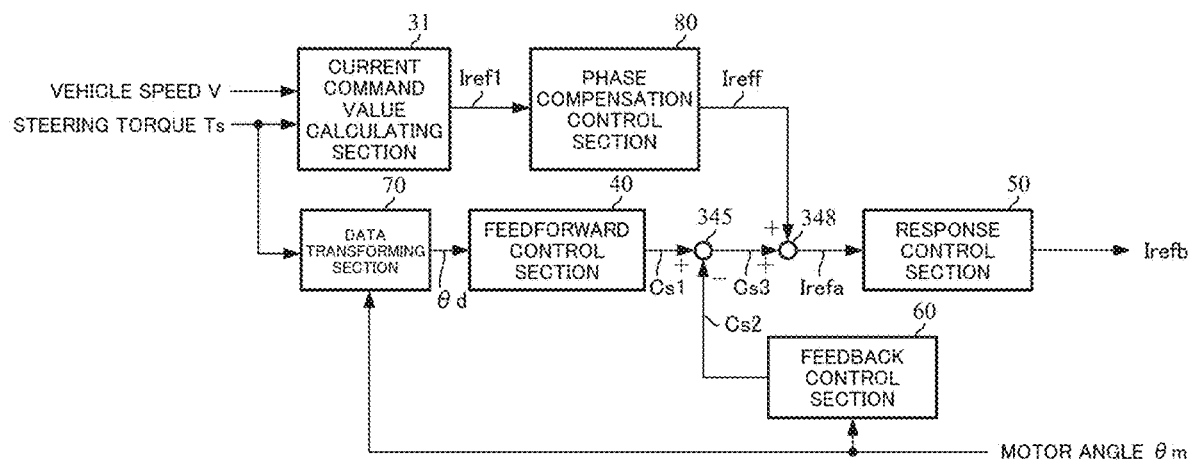
FIG. 18 is a block diagram showing a configuration example (a fourth embodiment) of the present invention.

FIG. 18 is a block diagram of the fourth embodiment. Compared with the first embodiment shown in FIG. 9, a phase compensation control section 80 is added after the current command value calculating section 31 in the fourth embodiment.

The phase compensation control section 80 performs the third action, that is, an action for "further stabilization with respect to the characteristic obtained by performing the pole-and-zero cancellation in order to improve the robust stability". Specifically, performing phase compensation enables the stabilization. As a phase compensation characteristic, it is possible to use, for example, a characteristic of a phase compensating section shown in the publication of Japanese Patent No. 3922010 B2.

In the fourth embodiment, the current command value Iref1 which the current command value calculating section 31 outputs is inputted into the phase compensation control section 80, the phase compensation control section 80 performs the phase compensation with respect to the current command value Iref1, and outputs the result of the phase compensation as a current command value Ireff to the adding section 348.

Moreover, it is possible to use a phase compensation characteristic other than the characteristic described in the publication of Japanese Patent No. 3922010 B2 as a phase compensation characteristic.

EXPLANATION OF REFERENCE NUMERALS

1 steering wheel
2 column shaft (steering shaft, handle shaft)
10 torque sensor
12 vehicle speed sensor
20 motor
30 control unit (ECU)
31 current command value calculating section
40 feedforward control section
50, 51, 52 response control section
60, 61 feedback control section
70 data transforming section
80 phase compensation control section
610 second order differential section
620 gain section
650 phase advance compensating section

The invention claimed is:

1. A control unit of an electric power steering apparatus that drives a motor based on a current command value, and assists and controls a steering system, comprising:
   an electronic control unit (ECU) configured to implement:
      a feedforward control section that inputs a steering wheel angle and calculates a first compensation signal compensating said current command value;
      a feedback control section that inputs a steering angle and calculates a second compensation signal compensating said current command value; and
      a response control section that adjusts said current command value based on said first compensation signal and said second compensation signal;
   wherein said feedback control section arranges a pole of a characteristic of a vibration mode where steering wheel inertia and motor inertia that constitute said electric power steering apparatus are relatively displaced in a steering stabilization frequency domain; and
   wherein said response control section performs pole-and-zero cancellation so as to cancel said characteristic of said vibration mode.

2. The control unit of the electric power steering apparatus according to claim 1,
   wherein said response control section inputs a difference between said first compensation signal and said second compensation signal.

3. The control unit of the electric power steering apparatus according to claim 1,
   wherein a first response control section that inputs said first compensation signal and a second response control section that inputs said second compensation signal are comprised as said response control section; and
   wherein a difference between an output of said first response control section and an output of said second response control section is used for adjustment of said current command value.

4. The control unit of the electric power steering apparatus according to claim 3,
   wherein said feedback control section performs pole arrangement with respect to said characteristic of said vibration mode by raising a resonance ratio of a two-inertia system consisting of said steering wheel inertia and said motor inertia.

5. The control unit of the electric power steering apparatus according to claim 3,
   wherein said feedback control section provides said pole with damping by a phase advance characteristic.

6. The control unit of the electric power steering apparatus according to claim 3,
   wherein a damping factor of said characteristic of said vibration mode becomes more than or equal to a predetermined value by said pole-and-zero cancellation performed by said response control section.

7. The control unit of the electric power steering apparatus according to claim 3,
   wherein said feedforward control section enables stability and responsiveness of said characteristic of said vibration mode at on-center to be set independently.

8. The control unit of the electric power steering apparatus according to claim 3,
wherein said control unit further comprises a phase compensation control section that performs phase compensation with respect to said current command value before said response control section adjusts said current command value.

9. The control unit of the electric power steering apparatus according to claim 1,
wherein said steering stabilization frequency domain ranges in about 20 Hz and over.

10. The control unit of the electric power steering apparatus according to claim 1,
wherein said feedback control section performs pole arrangement with respect to said characteristic of said vibration mode by raising a resonance ratio of a two-inertia system consisting of said steering wheel inertia and said motor inertia.

11. The control unit of the electric power steering apparatus according to claim 10,
wherein said resonance ratio is more than or equal to about 2.

12. The control unit of the electric power steering apparatus according to claim 1,
wherein said feedback control section provides said pole with damping by a phase advance characteristic.

13. The control unit of the electric power steering apparatus according to claim 1,
wherein a damping factor of said characteristic of said vibration mode becomes more than or equal to a predetermined value by said pole-and-zero cancellation performed by said response control section.

14. The control unit of the electric power steering apparatus according to claim 13,
wherein said predetermined value is about 0.6.

15. The control unit of the electric power steering apparatus according to claim 1,
wherein said feedforward control section enables stability and responsiveness of said characteristic of said vibration mode at on-center to be set independently.

16. The control unit of the electric power steering apparatus according to claim 15,
wherein said feedforward control section performs phase compensation.

17. The control unit of the electric power steering apparatus according to claim 1,
wherein said control unit further comprises a phase compensation control section that performs phase compensation with respect to said current command value before said response control section adjusts said current command value.

* * * * *